United States Patent
Woodard et al.

(10) Patent No.: US 8,179,203 B2
(45) Date of Patent: May 15, 2012

(54) WIRELESS ELECTRICAL DEVICE USING OPEN-CIRCUIT ELEMENTS HAVING NO ELECTRICAL CONNECTIONS

(75) Inventors: Stanley E. Woodard, Hampton, VA (US); Bryant Douglas Taylor, Smithfield, VA (US)

(73) Assignee: The United States of America, as represented by the Administrator of the National Aeronautics and Space Administration, Washington, DC (US)

( * ) Notice: Subject to any disclaimer, the term of this patent is extended or adjusted under 35 U.S.C. 154(b) by 282 days.

(21) Appl. No.: 12/569,984

(22) Filed: Sep. 30, 2009

(65) Prior Publication Data

US 2010/0109818 A1 May 6, 2010

Related U.S. Application Data

(60) Provisional application No. 61/104,027, filed on Oct. 9, 2008.

(51) Int. Cl.
 *H03H 2/00* (2006.01)
 *G08B 13/14* (2006.01)
(52) U.S. Cl. .................. 333/24 R; 340/572.1
(58) Field of Classification Search ............... 333/24 R, 333/175; 340/572.1, 572.2, 572.4, 572.5
See application file for complete search history.

(56) References Cited

U.S. PATENT DOCUMENTS

| | | | |
|---|---|---|---|
| 3,219,942 A | 11/1965 | Bell | |
| 3,412,359 A | 11/1968 | Schwyn et al. | |
| 4,021,705 A * | 5/1977 | Lichtblau | 361/765 |
| 4,745,401 A * | 5/1988 | Montean | 340/572.3 |
| 4,778,552 A * | 10/1988 | Benge et al. | 340/572.3 |
| 5,049,704 A | 9/1991 | Matouschek | |
| 5,285,734 A | 2/1994 | MacPherson | |
| 5,506,566 A | 4/1996 | Oldfield | |
| 5,541,577 A | 7/1996 | Cooper et al. | |
| 5,675,319 A | 10/1997 | Rivenbert et al. | |
| 5,689,263 A * | 11/1997 | Dames | 342/51 |
| 5,705,981 A | 1/1998 | Goldman | |
| 5,892,425 A | 4/1999 | Kuhn et al. | |
| 5,969,590 A | 10/1999 | Gutierrez | |
| 6,194,987 B1 | 2/2001 | Zhou et al. | |
| 6,304,083 B1 | 10/2001 | Owens | |
| 6,313,747 B2 * | 11/2001 | Imaichi et al. | 340/572.5 |

(Continued)

FOREIGN PATENT DOCUMENTS

EP 112783 A2 7/1984

OTHER PUBLICATIONS

U.S. Appl. No. 11/856,807, filed Sep. 18, 2007, Stanley E. Woodard, et al.

(Continued)

*Primary Examiner* — Dean O Takaoka
(74) *Attorney, Agent, or Firm* — Robin W. Edwards

(57) ABSTRACT

A wireless electrical device includes an electrically unconnected electrical conductor and at least one electrically unconnected electrode spaced apart from the electrical conductor. The electrical conductor is shaped for storage of an electric field and a magnetic field. In the presence of a time-varying magnetic field, the electrical conductor so-shaped resonates to generate harmonic electric and magnetic field responses. Each electrode is at a location lying within the magnetic field response so-generated and is constructed such that a linear movement of electric charges is generated in each electrode due to the magnetic field response so-generated.

32 Claims, 5 Drawing Sheets

U.S. PATENT DOCUMENTS

| | | |
|---|---|---|
| 6,348,391 B1 | 2/2002 | Fattaruso |
| 6,444,517 B1 | 9/2002 | Hsu et al. |
| 6,498,325 B1 | 12/2002 | Akel et al. |
| 6,515,587 B2 | 2/2003 | Herbert |
| 6,573,818 B1 | 6/2003 | Klemmer et al. |
| 6,611,188 B2 | 8/2003 | Yeo et al. |
| 6,661,079 B1 | 12/2003 | Bikulcius |
| 6,662,642 B2 | 12/2003 | Breed et al. |
| 6,738,697 B2 | 5/2004 | Breed |
| 6,741,169 B2 | 5/2004 | Magiawala et al. |
| 6,758,089 B2 | 7/2004 | Breed et al. |
| 6,838,970 B2 | 1/2005 | Basteres et al. |
| 6,850,824 B2 | 2/2005 | Breed |
| 6,853,079 B1 | 2/2005 | Hopper et al. |
| 6,922,126 B1 | 7/2005 | Okamoto et al. |
| 6,963,281 B2 | 11/2005 | Buckley |
| 6,988,026 B2 | 1/2006 | Breed et al. |
| 6,995,669 B2 | 2/2006 | Morales |
| 7,034,672 B2 | 4/2006 | Dinello et al. |
| 7,050,017 B2 | 5/2006 | King et al. |
| 7,082,359 B2 | 7/2006 | Breed et al. |
| 7,086,593 B2 | 8/2006 | Woodard et al. |
| 7,089,099 B2 | 8/2006 | Shostak et al. |
| 7,103,460 B1 | 9/2006 | Breed |
| 7,135,973 B2 | 11/2006 | Kittel et al. |
| 7,159,774 B2 | 1/2007 | Woodard et al. |
| 7,161,476 B2 | 1/2007 | Hardman et al. |
| 7,194,912 B2 | 3/2007 | Jordan et al. |
| 7,255,004 B2 | 8/2007 | Taylor et al. |
| 7,278,324 B2 | 10/2007 | Smits et al. |
| 2003/0082859 A1 | 5/2003 | Ichijo et al. |
| 2004/0142603 A1 | 7/2004 | Walker |
| 2005/0007239 A1 | 1/2005 | Woodard et al. |
| 2005/0011163 A1 | 1/2005 | Ehrensvard |
| 2005/0024180 A1 | 2/2005 | Handa |
| 2005/0122305 A1 | 6/2005 | Murao et al. |
| 2005/0149169 A1 | 7/2005 | Wang et al. |
| 2005/0156604 A1 | 7/2005 | Red'ko et al. |
| 2005/0164055 A1 | 7/2005 | Hasegawa et al. |
| 2006/0104330 A1 | 5/2006 | Ho Limb et al. |
| 2006/0191887 A1 | 8/2006 | Baer et al. |
| 2006/0195705 A1 | 8/2006 | Ehrensvard et al. |
| 2006/0243043 A1 | 11/2006 | Breed |
| 2006/0250239 A1 | 11/2006 | Melton |
| 2007/0113642 A1 | 5/2007 | Bonne et al. |
| 2007/0157718 A1 | 7/2007 | Woodard et al. |
| 2007/0181683 A1 | 8/2007 | Woodard et al. |
| 2007/0183110 A1 | 8/2007 | Woodard et al. |
| 2007/0285875 A1 | 12/2007 | Duff, Jr. |
| 2008/0186124 A1 | 8/2008 | Schaffer et al. |

OTHER PUBLICATIONS

U.S. Appl. No. 11/864,012, filed Sep. 28, 2007, Stanley E. Woodard, et al.

U.S. Appl. No. 11/930,222, filed Oct. 31, 2007, Stanley E. Woodard, et al.

U.S. Appl. No. 11/671,089, filed Aug. 9, 2007, Woodard et al.

U.S. Appl. No. 11/856,807, filed Sep. 18, 2007, Woodard et al.

Stanley E. Woodard et al., "Magnetic Field Response Measurement Acquisition System," NASA TM 2005-213518, NASA, (Feb. 1, 2005).

Stanley E. Woodard and Bryant D. Taylor, "Measurement of Multiple Unrelated Physical Quantities Using a Single Magnetic Field Response Sensor," Measurement Science and Technology (UK), (vol. 18), (Issue 200), (pp. 1603-1613), (Apr. 3, 2007).

* cited by examiner

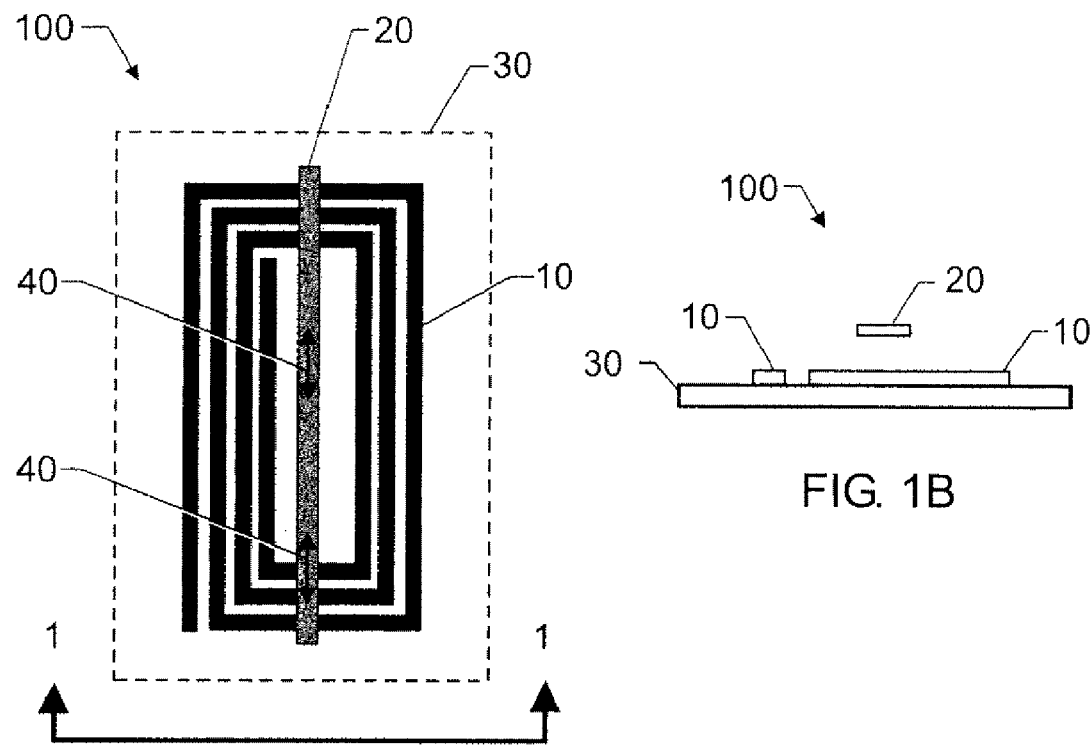
FIG. 1A
FIG. 1B
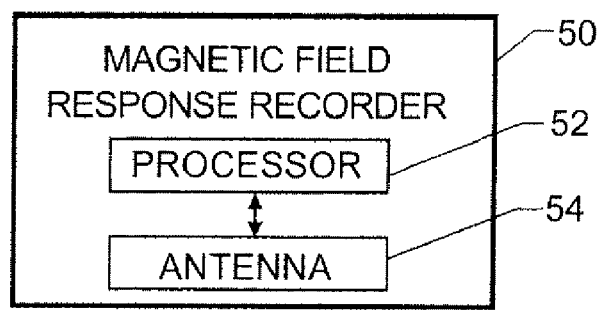
FIG. 2
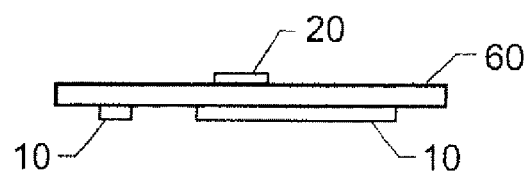
FIG. 3

WIRELESS ELECTRICAL DEVICE USING OPEN-CIRCUIT ELEMENTS HAVING NO ELECTRICAL CONNECTIONS

Pursuant to 35 U.S.C. §119, the benefit of priority from provisional application 61/104,027, hereby incorporated by reference in its entirety, with a filing date of Oct. 9, 2008, is claimed for this non-provisional application.

ORIGIN OF THE INVENTION

This invention was made in part by an employee of the United States Government and may be manufactured and used by or for the Government of the United States of America for governmental purposes without the payment of any royalties thereon or therefor.

BACKGROUND OF THE INVENTION

1. Field of the Invention

This invention relates to wireless electrical devices. More specifically, the invention is a wireless electrical device using open-circuit elements having no electrical connections where the elements include an electrically-conductive geometric pattern and a spaced-apart electrode.

2. Description of the Related Art

Electrical devices typically utilize a plurality of circuit elements wired together to form a circuit. As is well understood in the art, such electrical devices function for a designed purpose when electric current flows through the circuit. If an unwanted break occurs in the circuit, electric current ceases to flow and the circuit must be repaired or replaced to restore device function. Circuit repair or replacement causes downtime, requires manpower, and can be expensive.

SUMMARY OF THE INVENTION

Accordingly, it is an object of the present invention to provide an electrical device that does not require hardwire connections between the device's circuit elements.

Another object of the present invention is to provide an electrical device that is powered and operated in a wireless fashion.

Other objects and advantages of the present invention will become more obvious hereinafter in the specification and drawings.

In accordance with the present invention, a wireless electrical device includes an electrical conductor and at least one electrode. The electrical conductor has first and second ends and is shaped therebetween for storage of an electric field and a magnetic field. The first and second ends remain electrically unconnected such that the electrical conductor so-shaped defines an unconnected open-circuit having inductance and capacitance. In the presence of a time-varying magnetic field, the electrical conductor so-shaped resonates to generate harmonic electric and magnetic field responses, each of which has a frequency, amplitude and bandwidth associated therewith.

Each electrode has no electrical connections, is spaced apart from the electrical conductor at a location lying within the magnetic field response so-generated, and is constructed such that a linear movement of electric charges is generated in each electrode due to the magnetic field response so-generated.

BRIEF DESCRIPTION OF THE DRAWINGS

FIG. 1A is a plan view of a wireless electrical device in accordance with an embodiment of the present invention;

FIG. 1B is an end view of the wireless electrical device taken along line 1-1 in FIG. 1A;

FIG. 2 is a schematic view of a magnetic field response recorder used in an embodiment of the present invention;

FIG. 3 is an end view of a wireless electrical device configured as a parallel-plate capacitor in accordance with another embodiment of the present invention;

DETAILED DESCRIPTION OF THE INVENTION

Figure 4:
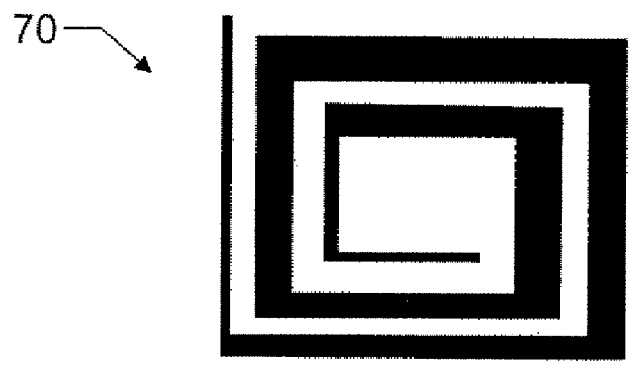
FIG. 4 is a schematic view of a spiral trace conductor pattern whose traces are non-uniform in width.

Referring now to the drawings and more particularly to FIG. 1, a wireless electrical device in accordance with an embodiment of the present invention is shown and is referenced generally by numeral 100. As will be explained further below, the general features of electrical device 100 serve as the building block for a variety of possible functions such as energy storage, detecting/measuring out-of-plane rotational and translational displacement, and detecting/measuring in-plane rotational and translational displacement. The illustrated electrical device 100 is presented as an exemplary embodiment, as there will be many possible embodiments that can be constructed based on the basic principles of the present invention without departing from the scope thereof. In the illustrated embodiment, electrical device 100 includes a pattern 10 of electrically conductive material and an electrically unconnected electrode 20 spaced apart from pattern 10.

Electrical conductor pattern 10 is any electrical conductor (e.g., wire, run, thin-film trace, etc.) that can be shaped to form an open-circuit pattern that can store an electric field and a magnetic field. Pattern 10 is a single-component open-circuit element with no electrical connections being made thereto or therewithin. The term "open-circuit pattern" as used herein means that the conductor has two ends that are electrically unconnected, the conductor pattern is an electrical open-circuit having inductance and capacitance attributes, and the pattern has no electrical connections.

Pattern 10 can be a stand-alone electrically-conductive run. Pattern 10 can also be made from an electrically-conductive run or thin-film trace that can be deposited directly onto or embedded within an optional substrate material 30 (referenced by dashed lines to indicate the optional nature thereof) that is electrically insulating and non-conductive. The particular choice of the substrate/embedding material can vary without departing from the scope of the present invention. Although not a requirement of the present invention, the surface on which pattern 10 is deposited is typically a planar surface. Techniques used to deposit pattern 10 directly onto substrate 30 can be any conventional metal-conductor deposition process to include thin-film fabrication techniques. As will be explained further below, pattern 10 can be constructed to have a uniform or non-uniform width, and/or uniform or non-uniform spacing between adjacent portions of the pattern's runs/traces.

The basic features of pattern 10 and the principles of operation for electrical device 100 will be explained for a spiral-shaped conductor pattern. However, it is to be understood that the present invention could be practiced using other geometrically-patterned conductors provided the pattern has the attributes described herein. The basic features of a spiral-shaped conductor that can function as pattern 10 are described in detail in U.S. Patent Publication No. 2007/0181683, the contents of which are hereby incorporated by reference in their entirety. For purpose of a complete description of the present invention, the relevant portions of this publication will be repeated herein.

As is well known and accepted in the art, a spiral inductor is ideally constructed/configured to minimize parasitic capacitance so as not to influence other electrical components that will be electrically coupled thereto. This is typically achieved by increasing the spacing between adjacent conductive portions or runs of the conductive spiral pattern. However, in the present invention, pattern 10 exploits parasitic capacitance. The capacitance of pattern 10 is operatively coupled with the pattern's inductance such that magnetic and electrical energy can be stored and exchanged by the pattern thereby creating a damped simple harmonic resonator. Since other geometric patterns of a conductor could also provide such a magnetic/electrical energy storage and exchange, it is to be understood that the present invention could be realized using any such geometrically-patterned conductor and is not limited to a spiral-shaped pattern.

The amount of inductance along any portion of a conductive run of pattern 10 is directly related to the length thereof and inversely related to the width thereof. The amount of capacitance between portions of adjacent conductive runs of pattern 10 is directly related to the length by which the runs overlap each other and is inversely related to the spacing between the adjacent conductive runs. The amount of resistance along any portion of a conductive run of pattern 10 is directly related to the length and inversely related to the width of the portion. Total capacitance, total inductance and total resistance for a spiral pattern are determined simply by adding the effective contributions due to individual portions of the pattern. For example, the effective inductance contribution of a trace portion is the resultant change in the total inductance of pattern 10 due to the changes in the pattern's distributed self-inductance and distributed mutual inductance due to the addition of the trace. The effective capacitance contribution of a trace portion is the resulting change in the capacitance of pattern 10 due to the addition of the trace portion as a result of the charge in the portion creating electric fields with the charges in other parts of pattern 10 thus increasing the total distributed capacitance. The geometries of the various portions of the conductive runs of the pattern can be used to define the pattern's resonant frequency.

Pattern 10 with its distributed inductance operatively coupled to its distributed capacitance defines a magnetic field response sensor. In the presence of a time-varying magnetic field, pattern 10 electrically oscillates at a resonant frequency that is dependent upon the capacitance, inductance and resistance of pattern 10. This oscillation occurs as the energy in the magnetic field along the length of pattern 10 is harmonically transferred to the electric field between parallel portions of pattern 10. That is, when excited by a time-varying magnetic field, pattern 10 resonates a harmonic electric field and a harmonic magnetic field with each field being defined by a frequency, amplitude, and bandwidth.

The application of an oscillating magnetic field to pattern 10, as well as the reading of the induced harmonic response at a resonant frequency, can be accomplished by a magnetic field response recorder. The operating principles and construction details of such a recorder are provided in U.S. Pat. Nos. 7,086,593 and 7,159,774, the contents of which are hereby incorporated by reference in their entirety. Briefly, as shown in FIG. 2, a magnetic field response recorder 50 includes a processor 52 and a broadband radio frequency (RF) antenna 54 capable of transmitting and receiving RF energy. Processor 52 includes algorithms embodied in software for controlling antenna 54 and for analyzing the RF signals received from the magnetic field response sensor defined by pattern 10. On the transmission side, processor 52 modulates an input signal that is then supplied to antenna 54 so that antenna 54 produces either a broadband time-varying magnetic field or a single harmonic field. On the reception side, antenna 54 receives harmonic magnetic responses produced by pattern 10. Antenna 54 can be realized by two separate antennas or a single antenna that is switched between transmission and reception.

Electrode 20 is representative of one or more electrical conductors having no electrical connections made thereto (i.e., it is electrically unconnected) and capable of supporting movement of electrical charges therein. In terms of the present invention, electrode 20 is spaced-apart from pattern 10 at a location that lies within the magnetic field response (not shown) generated by pattern 10 when pattern 10 is wirelessly excited by, for example, recorder 50 as explained above. Electrode 20 should have a length-to-width aspect ratio (i.e., length divided by width) that is large enough such that the effects of linear movement of electric charges along the length of electrode 20 outweigh the effects of eddy currents in electrode 20 when electrode 20 is positioned in the magnetic field response of pattern 10. The length-to-width aspect ratio of electrode 20 will typically be designed to satisfy a particular device's performance criteria. Accordingly, it is to be understood that the particular length-to-width aspect ratio of electrode 20 is not a limitation of the present invention.

In the illustrated embodiment, pattern 10 lies in a two-dimensional plane and electrode 20 lies in a plane that is parallel to that of pattern 10. However, as will be explained further below, pattern 10 could occupy three-dimensional space, pattern 10 and electrode 20 could reside in non-parallel planes, and/or the spacing between pattern 10 and electrode 20 could change during the use of electrical device 100. Further, in the illustrated embodiment, the length dimension of electrode 20 forms a non-zero angular orientation with respect to the overlapped portions of pattern 10. More specifically, for the illustrated electrical device 100, electrode 20 is oriented perpendicular to the overlapped portions of pattern 10. However, other embodiments of the present invention could utilize other non-zero angular orientations or even a zero angular orientation as will be described later herein.

In operation, when pattern 10 is exposed to a time-varying magnetic field (e.g., as generated by recorder 50, a moving magnet, or any other source/method that generates a time-varying magnetic field), pattern 10 resonates harmonic electric and magnetic fields. The generated magnetic field is generally spatially larger that the generated electric field. Electrode 20 is positioned relative to pattern 10 such that it will lie within at least the generated magnetic field.

In the presence of a time-varying magnetic field, pattern 10 resonates to generate harmonic electric and magnetic field responses. With electrode 20 configured and positioned as described above, the magnetic field response of pattern 10 generates an electromotive force in electrode 20 such that electric charges flow linearly in both directions along the length of electrode 20 as indicated by arrows 40. Note that the current flow in electrode 20 by linear charge flow 40 is achieved without any electrical contact with (i) pattern 10, (ii) electrode 20, or (iii) between pattern 10, electrode 20 and antenna 54.

Typically, for fixed excitation conditions, the magnetic field response frequency, amplitude, and bandwidth of pattern 10 are dependent upon the electric conductivity of any material placed within its magnetic field and electric field. When a material having electrical conductivity properties and a relatively small length-to-width aspect ratio is placed inside either the generated magnetic field or electric field of pattern 10, the generated fields around pattern 10 are attenuated as eddy currents with resistive losses are the dominant effects generated in the conductive material. The energy lost from the generated magnetic field and electric field will alter the magnetic field response frequency, amplitude and bandwidth of pattern 10. More specifically, since there is less energy in the generated magnetic field, pattern 10 exhibits lower inductance and capacitance, and produces lower response amplitude and higher response frequency.

However, in accordance with the present invention, the conductive material area of electrode 20 defines a relatively large length-to-width aspect ratio. The length-to-width aspect ratio is sufficient when more bi-directional flowing electric current moves along the electrode and less eddy currents are produced when electrode 20 is placed within the magnetic response of pattern 10. Once electrode 20 is electrically powered via oscillating harmonics from either pattern 10 and/or the response recorder antenna, electrode 20 will have a magnetic field resulting from the current created in the electrode 20 that is coupled to that of pattern 10. The charge on the electrode 20 will result in an electric field between the charge on pattern 10 and electrode 20. Therefore, electrode 20 and the overlapped portions of pattern 10 will behave somewhat like capacitor plates in a closed electrical circuit, except electrode 20 also has a current that creates a magnetic field that is also coupled to the magnetic field of pattern 10. The magnetic field on electrode 20 increases as the spacing between electrode 20 and pattern 10 decreases because electrode 20 is exposed to a higher magnetic strength.

The magnetic flux, $\Phi_B$, from the responding magnetic field of pattern 10 acting on the electrode 20 is written as $$\Phi_B = \int B \cdot dS \quad (1)$$

Note that B=B(r) is a vector of flux strength and direction while S is a vector proportional to the surface area of electrode 20 in the normal direction. B=B(r) decreases monotonically as distance r increases from the surface of pattern 10. Maximum flux occurs when the flux and the normal of electrode 20 are parallel to one another.

In accordance with Faraday's law of induction, the induced electromotive force produced in the sensor is equal in magnitude to the rate of change in the flux, or $$\varepsilon = -\frac{d\Phi_B}{dt} \quad (2)$$

Since the responding magnetic field response of pattern 10 is harmonic, the resulting electromotive force produced in electrode 20 is dependent upon flux, flux strength, and the area of the electrode (for bi-direction flowing current), and is proportional to the frequency of the flux.

As the spacing decreases between electrode 20 and pattern 10, the electromotive force in electrode 20 increases resulting in the charges moving faster (i.e., higher current). The increase in current in electrode 20 causes electrode 20 to have a larger magnetic field that is coupled to that of pattern 10. Also, if the surface orientation of electrode 20 with respect to pattern 10 changes, the electromotive force will change. The electromotive force is a maximum when the electrode surface normal is parallel to the magnetic flux of pattern 10, and is zero when the electrode surface normal is perpendicular to the magnetic flux of pattern 10.

The produced electromotive force in electrode 20 is dependent upon the rate that the responding magnetic field of pattern 10 changes, and the relative position and orientation of electrode 20 and pattern 10. When the responding magnetic field frequency of pattern 10 is constant while the effective field strength (i.e., high field amplitude) of the magnetic field response of pattern 10 acting upon electrode 20 increases as electrode 20 gets closer to pattern 10, the rate that the time-varying magnetic field exposed to electrode 20 changes increases, resulting in a higher induced electromotive force in electrode 20. The higher electromotive force in electrode 20 produces a higher current in electrode 20 and therefore a higher magnetic field in electrode 20. Therefore, (i) the electric field between electrode 20 and the overlapped portion of pattern 10 increases with decreased spacing therebetween (as is the case with capacitor plates), and (ii) the magnetic field of electrode 20 increases with increased rate of charge movement resulting from decreased spacing between pattern 10 and electrode 20. The responding magnetic field of electrode 20 is coupled to the responding magnetic field of pattern 10. The responding magnetic field frequency of pattern 10/electrode 20 system read by response recorder 50 decreases as either magnetic or electric field between pattern 10 and electrode 20 increases. Therefore, the change to the responding magnetic and electric field of pattern 10 together results in a more pronounced change than if only one of the fields changed.

If the magnetic field of electrode 20 is oriented 90° with respect to that of the traces of pattern 10 that overlap it, any destructive interference between electrode 20 and pattern 10 should vanish. Accordingly, if the relative positions and orientations of pattern 10 with respect to electrode 20 remain fixed, then the magnetic field response of electrical device 100 remains unchanged for fixed excitation conditions. These fixed conditions and resulting magnetic field response of electrical device 100 define a baseline frequency/amplitude/bandwidth response for electrical device 100 that is recorded prior to using electrical device 100.

If pattern 10 geometrically remains unchanged and environmental influences upon pattern 10 remain constant, changes in the baseline response of electrical device 100 will occur wherever linear charge flow 40 changes. This will happen if the spacing between pattern 10 and electrode 20 changes (e.g., out-of-plane displacement, rotation of electrode 20 surface with respect to rotation of pattern 10 surface, or if there are changes in the in-plane angular orientation of electrode 20 with respect to the overlapped portions of pattern 10). Accordingly, electrical device 100 is readily configured for a variety of applications to include position or displacement sensors, strain sensors, torque sensors, shear sensors, pressure sensors, or rotational sensors where a change in at least one of frequency, amplitude and bandwidth with respect to the baseline response indicates a parameter of interest.

The present invention can also be configured for energy storage if the space between pattern 10 and electrode 20 is filled with a dielectric material 60 as illustrated in FIG. 3. That is, since both pattern 10 and electrode 20 will experience an electromotive force when pattern 10 is excited as described above, pattern 10 and electrode 20 with dielectric material 60 disposed therebetween function like a parallel-plate capacitor that stores electrical energy. Once again, no electrical connections are made with pattern 10, electrode 20, or between pattern 10 and electrode 20.

Once the baseline response of electrical device 100 is known and electrical device 100 is placed in use, interrogation or monitoring of electrical device 100 (for changes in response relative to the baseline response) can be carried out continuously, periodically, on-demand, etc., without departing from the scope of the present invention.

Figure 5:
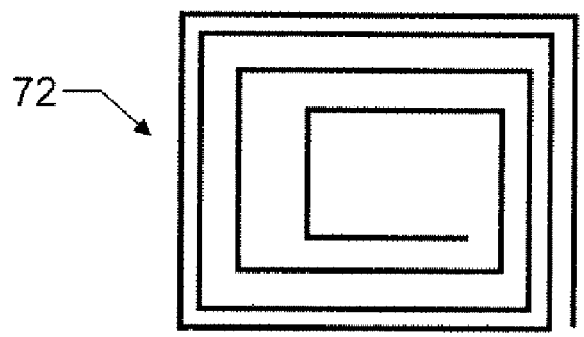
FIG. 5 is a schematic view of a spiral trace conductor pattern having non-uniform spacing between the traces thereof.
Figure 6:
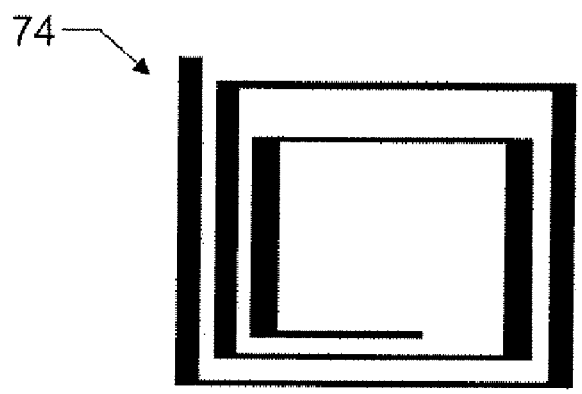
FIG. 6 is a schematic view of a spiral trace conductor pattern having non-uniform trace width and non-uniform trace spacing.

As mentioned above, both the width of the pattern's conductive runs/traces and the spacing between adjacent portions of the conductive runs/traces can be uniform. However, the present invention is not so limited. For example, FIG. 4 illustrates an isolated view of a spiral pattern 70 in which the width of the conductive trace is non-uniform while the spacing between adjacent portions of the conductive trace is uniform. FIG. 5 illustrates a spiral pattern 72 in which the width of the conductive trace is uniform, but the spacing between adjacent portions of the conductive trace is non-uniform. Finally, FIG. 6 illustrates a spiral pattern 74 having both a non-uniform width conductive trace and non-uniform spacing between adjacent portions of the conductive trace.

Figure 7:
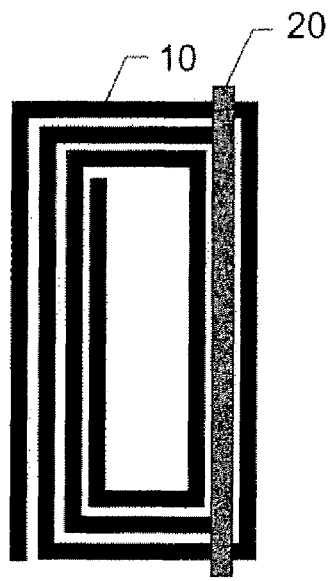
FIG. 7 is a schematic view of a wireless electrical device using a single electrode in accordance with another embodiment of the present invention.
Figure 8:
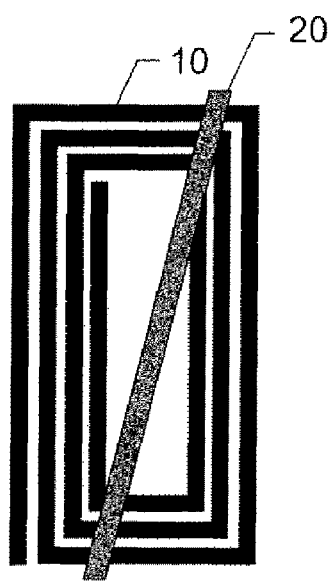
FIG. 8 is a schematic view of a wireless electrical device using a single electrode in accordance with yet another embodiment of the present invention.
Figure 9:
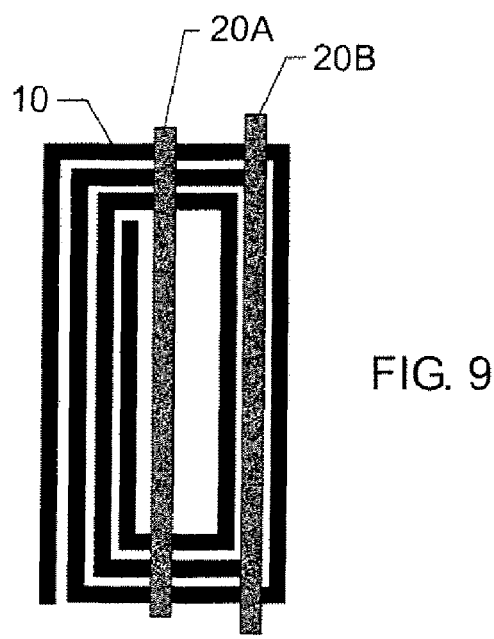
FIG. 9 is a schematic view of a wireless electrical device using two electrodes in accordance with another embodiment of the present invention.
Figure 10A:
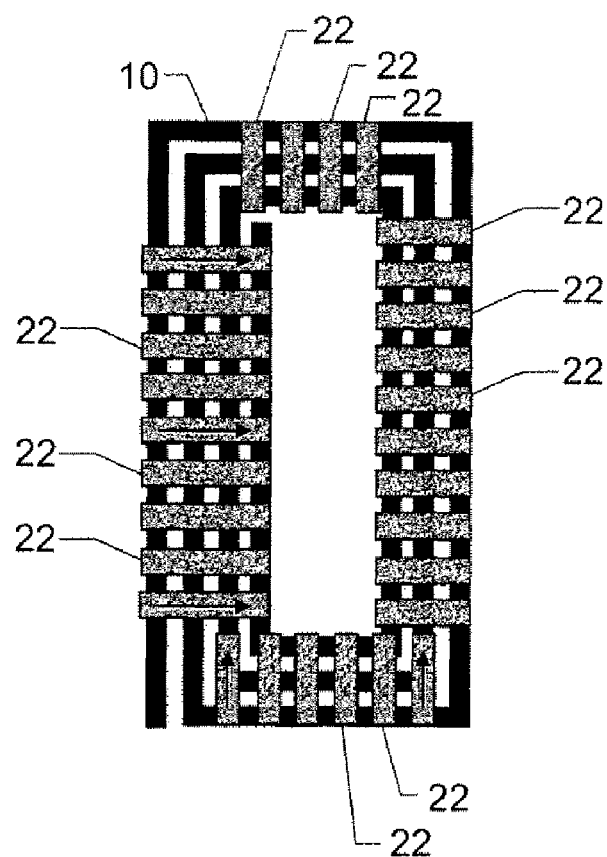
FIGS. 10A and 10B are schematic views of a wireless electrical device using multiple distributed electrodes in accordance with another embodiment of the present invention.
Figure 10B:
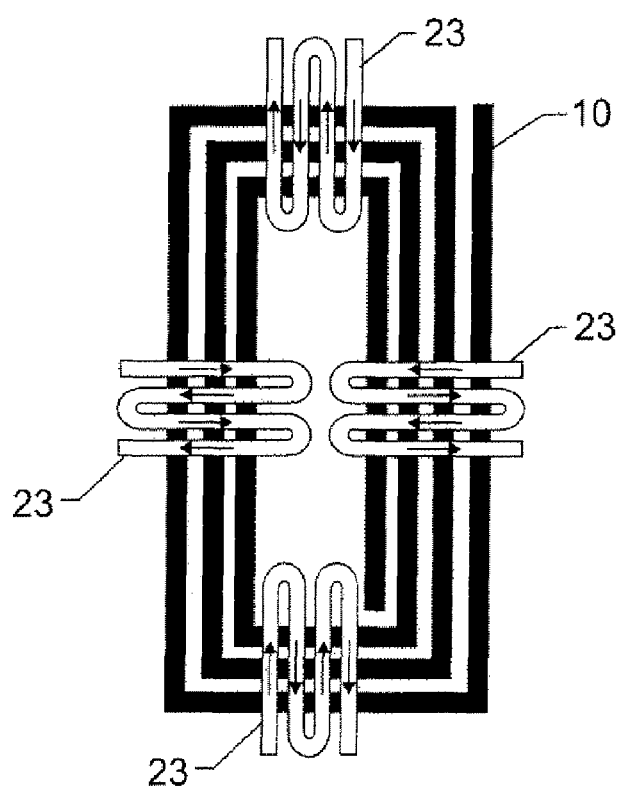
Figure 11:
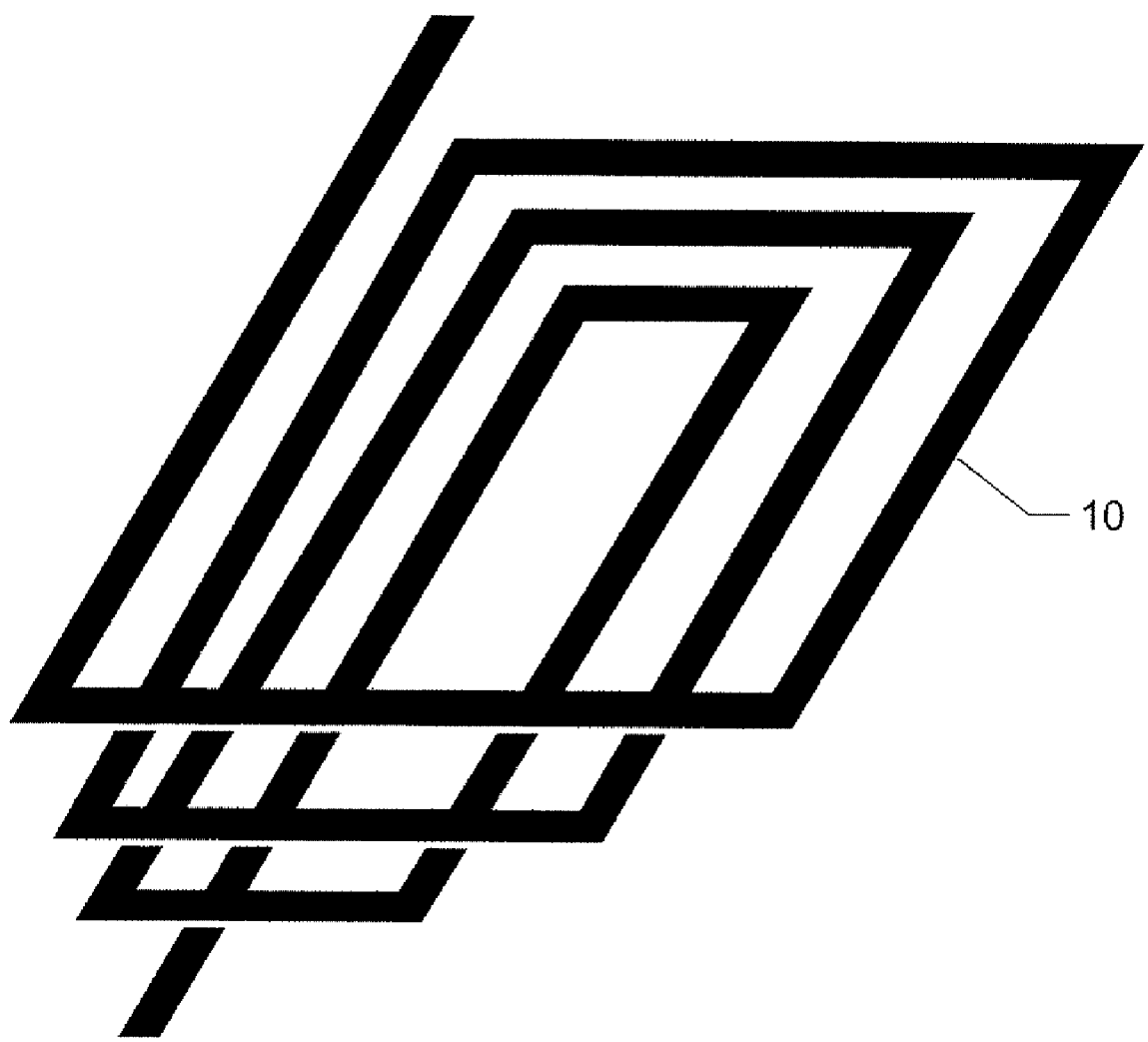
FIG. 11 is an isolated perspective view of a spiral electrical conductor pattern expanded into a three-dimensional space in accordance with another embodiment of the present invention.

A variety of pattern and electrode configurations can be used without departing from the scope of the present invention. By way of illustration, several such configurations are presented in FIGS. 7-11. In FIG. 7, electrode 20 is positioned such that its length forms a zero angular orientation with respect to the overlapped portions of pattern 10. FIG. 8 illustrates electrode 20 in non-zero, non-perpendicular angular orientation with respect to the overlapped portions of pattern 10. Although single electrodes have been shown in each of the above-described embodiments, the present invention is not so limited. Accordingly, FIG. 9 illustrates the use of two electrodes 20A and 20B with electrode 20A oriented at 90° with respect to the overlapped portions of pattern 10 and electrode 20B oriented at 0° with respect to the overlapped portions of pattern 10. FIG. 10A illustrates the use of a relatively large number of electrodes 22, distributed about pattern 10. Each of electrodes 22 is oriented at 90° with respect to the overlapped portion of pattern 10. FIG. 10B illustrates the use of meandering shaped electrodes 23, distributed about the four sides of pattern 10. Each portion of electrodes 23 is oriented at 90° with respect to the overlapped portion of pattern 10. The portion of magnetic field between parallel electrodes 22 of FIG. 10A has some destructive interference. Electrodes 23 of FIG. 108 constructively interfere with each other, resulting in a higher combined magnetic field. Finally, although the previous embodiments have been described for pattern 10 lying in a two-dimensional plane, the present invention is not so limited. Accordingly, FIG. 11 illustrates an isolated perspective view of spiral pattern 10 expanded or stretched into a three-dimensional space. An electrode (not shown for clarity of illustration) similar to the above-described electrode 20 can be spaced apart from expanded spiral pattern 10 in a variety of ways without departing from the scope of the present invention. For example, the electrode could be positioned above/below pattern 10, between the expanded "layers" of pattern 10, interwoven between parallel conductive portions of pattern 10, etc.

The advantages of the present invention are numerous. The wireless electrical device requires only a simple unconnected, open-circuit conductor shaped to store electric and magnetic fields, and at least one spaced-apart electrically-unconnected electrode. The wireless electrical device requires no electrically connected components, is simple to produce, and can be excited/powered using known field response recorder technology. The wireless electrical device can be employed in a variety of sensing, measurement, and energy storage applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A wireless electrical device, comprising:
    an electrical conductor having first and second ends and shaped to define a single spiral between said first and second ends for storage of an electric field and a magnetic field, said first and second ends remaining electrically unconnected at all times such that said electrical conductor so-shaped defines an unconnected open-circuit having inductance and capacitance wherein, in the presence of a time-varying magnetic field, said electrical conductor so-shaped resonates to generate harmonic electric and magnetic field responses, each of which has a frequency, amplitude and bandwidth associated therewith; and
    at least one electrode spaced apart from said electrical conductor at a location lying within at least said magnetic field response so-generated, wherein each electrode from said at least one electrode has a length-to-width aspect ratio such that a linear movement of electric charges is generated in said each electrode, said each electrode remaining electrically unconnected at all times.

2. A wireless electrical device as in claim 1, further comprising a magnetic field response recorder for wirelessly transmitting said time-varying magnetic field to said electrical conductor and for wirelessly detecting at least one of said frequency, amplitude and bandwidth associated with said magnetic field response so-generated.

3. A wireless electrical device as in claim 1, wherein said electrical conductor or comprises a thin-film trace.

4. A wireless electrical device as in claim 3, wherein said trace is uniform in width.

5. A wireless electrical device as in claim 3, wherein spacing between adjacent portions of said trace is uniform.

6. A wireless electrical device as in claim therein said trace is non-uniform in width.

7. A wireless electrical device as in claim 3, wherein spacing between adjacent portions of said trace is non-uniform.

8. A wireless electrical device as in claim 1, wherein said electrical conductor lies in a two-dimensional plane.

9. A wireless electrical device as in claim 1, wherein said electrical conductor occupies a three-dimensional space.

10. A wireless electrical device as in claim 1, wherein each electrode from said at least one electrode is at a non-zero angular orientation with respect to portions of said single spiral overlapped by said each electrode.

11. A wireless electrical device as in claim 1, wherein each electrode from said at least one electrode is at a zero angular orientation with respect to portions of said single spiral overlapped by said each electrode.

12. A wireless electrical device as in claim 1, wherein said at least one electrode comprises a plurality of electrodes with a first portion of said electrodes at non-zero angular orientations with respect to portions of said single spiral overlapped by said first portion, and a second portion of said electrodes at zero angular orientations with respect to portions of said single spiral overlapped by said second portion.

13. A wireless electrical device as in claim 1, further comprising dielectric material disposed between said electrical conductor and each electrode from said at least one electrode.

14. A wireless electrical device, comprising:
an electrical conductor in the form of a thin-film trace, said electrical conductor having first and second ends and shaped to form a single spiral between said first and second ends for storage of an electric field and a magnetic field, said first and second ends remaining electrically unconnected at all times such that said electrical conductor so-shaped defines an unconnected open-circuit having inductance and capacitance wherein, in the presence of a time-varying magnetic field, said electrical conductor so-shaped resonates to generate harmonic electric and magnetic field responses, each of which has a frequency, amplitude and bandwidth associated therewith; and
at least one electrode spaced apart from said electrical conductor at a location lying within at least said magnetic field response so-generated, wherein each electrode from said at least one electrode has a length-to-width aspect ratio such that a linear movement of electric charges is generated in said each electrode, said each electrode remaining electrically unconnected at all times.

15. A wireless electrical device as in claim 14, further comprising a magnetic field response recorder for wirelessly transmitting said time-varying magnetic field to said electrical conductor and for wirelessly detecting at least one of said frequency, amplitude and bandwidth associated with said magnetic field response so-generated.

16. A wireless electrical device as in claim 14, wherein said trace is uniform in width.

17. A wireless electrical device as in claim 14, wherein spacing between adjacent portions of said trace is uniform.

18. A wireless electrical device as in claim 14, wherein said trace is non-uniform in width.

19. A wireless electrical device as in claim 14, wherein spacing between adjacent portions of said trace is non-uniform.

20. A wireless electrical device as in claim 14, wherein said electrical conductor lies in a two-dimensional plane.

21. A wireless electrical device as in claim 14, wherein said electrical conductor occupies a three-dimensional space.

22. A wireless electrical device as in claim 14, wherein each electrode from said at least one electrode is at a non-zero angular orientation with respect to portions of said spiral overlapped by said each electrode.

23. A wireless electrical device as in claim 14, wherein each electrode from said at least one electrode is at a zero angular orientation with respect to portions of said spiral overlapped by said each electrode.

24. A wireless electrical device as in claim 15, wherein said at least one electrode comprises a plurality of electrodes with a first portion of said electrodes at non-zero angular orientations with respect to portions of said single spiral overlapped by said first portion, and a second portion of said electrodes at zero angular orientations with respect to portions of said single spiral overlapped by said second portion.

25. A wireless electrical device as in claim 14, further comprising dielectric material disposed between said electrical conductor and each electrode from said at least one electrode.

26. A wireless electrical device, comprising: an electrical, conductor having first and second ends and shaped to form a single spiral between said first and second ends for storage of an electric field and a magnetic field, said first and second ends remaining electrically unconnected at all times such that said electrical conductor so-shaped defines an unconnected open-circuit having inductance and capacitance wherein, in the presence of a time-varying magnetic field, said electrical conductor so-shaped resonates to generate harmonic electric and magnetic field responses, each of which has a frequency, amplitude and bandwidth associated therewith; at least one electrode spaced apart from said electrical conductor at a location lying within at least said magnetic field response so-generated, wherein each electrode from said at least one electrode has a length-to-width aspect ratio such that a linear movement of electric charges is generated in said each electrode, said each said electrode remaining electrically unconnected at all times; and a magnetic, field response recorder for wirelessly transmitting said time-varying magnetic field to said electrical conductor and for wirelessly detecting at least one of said frequency, amplitude and bandwidth associated with said magnetic field response so-generated.

27. A wireless electrical device as in claim 26, wherein said electrical conductor lies in a two-dimensional plane.

28. A wireless electrical device as in claim 26, wherein said electrical conductor occupies a three-dimensional space.

29. A wireless electrical device as in claim 26, wherein said each electrode is at a non-zero angular orientation with respect to portions of said single spiral overlapped by said each electrode.

30. A wireless electrical device as in claim 26, wherein said each electrode is at a zero angular orientation with respect to portions of said single spiral overlapped by said each electrode.

31. A wireless electrical device as in claim 26, wherein said at least one electrode comprises a plurality of electrodes with a first portion of said electrodes at non-zero angular orientations with respect to portions of said single spiral overlapped by said first portion, and a second portion of said electrodes at zero angular orientations with respect to portions of said single spiral overlapped by said second portion.

32. A wireless electrical device as in claim 26, further comprising dielectric material disposed between said electrical conductor and said each said electrode.

* * * * *